(12) United States Patent
Kim et al.

(10) Patent No.: US 9,488,844 B2
(45) Date of Patent: Nov. 8, 2016

(54) STEREOSCOPIC IMAGE DISPLAY DEVICE

(71) Applicant: SAMSUNG DISPLAY CO., LTD., Yongin, Gyeonggi-do (KR)

(72) Inventors: Hwi Kim, Seoul (KR); Hee-Seop Kim, Hwaseong-si (KR); Hae-Young Yun, Suwon-si (KR); Kyung-Ho Jung, Seoul (KR); Seung-Hoon Lee, Hwaseong-si (KR); Jung-Hwan Yi, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 22 days.

(21) Appl. No.: 14/307,978

(22) Filed: Jun. 18, 2014

(65) Prior Publication Data

US 2014/0300961 A1 Oct. 9, 2014

Related U.S. Application Data

(62) Division of application No. 12/564,434, filed on Sep. 22, 2009, now abandoned.

(30) Foreign Application Priority Data

Apr. 21, 2009 (KR) .................. 10-2009-0034496

(51) Int. Cl.
*G02B 27/22* (2006.01)
*H04N 13/04* (2006.01)
*G02F 1/1335* (2006.01)

(52) U.S. Cl.
CPC ...... *G02B 27/2214* (2013.01); *H04N 13/0404* (2013.01); *G02F 1/133526* (2013.01)

(58) Field of Classification Search
CPC ............ G02B 27/26; H04N 13/0404; H04N 13/0406; H04N 13/0436
USPC ............... 359/462, 463, 464; 348/58, 59
See application file for complete search history.

(56) References Cited

U.S. PATENT DOCUMENTS

| | | |
|---|---|---|
| 3,213,753 A | 10/1965 | Rogers |
| 5,852,512 A | 12/1998 | Chikazawa |
| 7,148,862 B2 | 12/2006 | Morishima et al. |
| 2007/0024968 A1 | 2/2007 | Kim et al. |
| 2007/0268590 A1 | 11/2007 | Schwerdtner |
| 2008/0278805 A1* | 11/2008 | Schwerdtner ...... H04N 13/0402 359/463 |
| 2009/0244270 A1* | 10/2009 | Takagi .................. G02B 27/26 348/58 |

FOREIGN PATENT DOCUMENTS

| | | |
|---|---|---|
| CN | 1160259 | 9/1997 |
| CN | 101138253 | 3/2008 |
| CN | 101158751 | 4/2008 |
| JP | 08-054693 | 2/1996 |

(Continued)

*Primary Examiner* — Audrey Y Chang
(74) *Attorney, Agent, or Firm* — F. Chau & Associates, LLC

(57) ABSTRACT

A stereoscopic image display device, including a display unit comprising a plurality of pixel units, wherein at least one of the pixel units has a short side extended in a first direction and a long side extended in a second direction different from the first direction, and an image conversion unit comprising a lenticular lens overlapped with at least two of the pixel units arranged in the first direction, wherein the lenticular lens is extended in the second direction and a first prism corresponding to the lenticular lens is arranged in the second direction.

5 Claims, 12 Drawing Sheets

(56) References Cited

FOREIGN PATENT DOCUMENTS

| | | |
|---|---|---|
| JP | 2006-293106 | 10/2006 |
| JP | 2008-533516 | 8/2008 |
| KR | 10200720118115 | 12/2007 |
| WO | 2006/094490 | 9/2006 |

* cited by examiner

STEREOSCOPIC IMAGE DISPLAY DEVICE

CROSS-REFERENCE TO RELATED APPLICATIONS

This application is a Divisional of U.S. patent application Ser. No. 12/564,434 filed on Sep. 22, 2009, which claims priority to Korean Patent Application No. 10-2009-0034496, filed on Apr. 21, 2009 in the Korean Intellectual Property Office (KIPO), the disclosures of which are incorporated by reference herein in their entireties.

BACKGROUND

1. Technical Field

The present inventive concept relates to a stereoscopic image display device. More particularly, the present inventive concept relates to a lenticular type stereoscopic image display device.

2. Discussion of the Related Art

Stereoscopic image display devices for displaying a three-dimensional (3D) image are used in the fields of 3D gaming and 3D movies, for example. The stereoscopic image display device may present the eyes of a viewer with two different two-dimensional (2D) flat images to display the 3D stereoscopic image. For example, when a viewer views a pair of two different 2D flat images with one image being displayed to each eye, the viewer's brain merges the pair of 2D flat images so that the viewer perceives a 3D image.

Stereoscopic image display devices may be classified as either a stereoscopic type or an autostereoscopic type depending on whether or not the viewer is required to wear glasses for viewing the stereoscopic image. In general, an autostereoscopic image display device, which does not require glasses, is used in a flat panel display device. Autostereoscopic image display devices may be classified as barrier type or lenticular type.

In the barrier type autostereoscopic image display device, light emitted from a left pixel and a right pixel is blocked or transmitted using a parallax barrier to control a viewing angle, so that a viewer's left eye views the left pixel and a viewer's right eye views the right pixel. Thus, a stereoscopic image is displayed. In the barrier type autostereoscopic image display device, since the light is partially blocked, the luminance may be decreased.

In the lenticular type autostereoscopic image display device, the light emitted from the left pixel and the right pixel is refracted using a lens to control a viewing angle, so that the stereoscopic image is displayed. In addition, most of the light passes through the lens, so that the luminance decrease may be minimized compared to the barrier type autostereoscopic image display device. In the lenticular type autostereoscopic image display device, the lens includes a vertical lens and a lens which is slanted according to the location of its lens axis with respect to a display panel.

The lens axis of the vertical lens is substantially perpendicular with the display panel, and thus the vertical lens may be easily mass-produced and stereoscopic image display devices employing the vertical lens may be easily manufactured. However, at a specific position of the display panel, a viewer may only view a light-blocking pattern, which classifies a plurality of pixels disposed in a matrix form, and thus may not view an image. In other words, the viewer may view a moiré pattern through the display panel at a specific position.

To help reduce the moiré pattern, the slanted lens has been used. However, the manufacturing of the slanted lens may require high precision since the lens axis of the slanted lens is slanted with respect to the display panel. In particular, when a multi-viewpoint stereoscopic image is displayed on the display panel using the slanted lens, crosstalk between viewpoints adjacent to each other may be generated to deteriorate display quality.

Accordingly, there is a need to improve the display quality of a stereoscopic image display device.

SUMMARY

According to an exemplary embodiment of the present inventive concept, a stereoscopic image display device includes a display unit and an image conversion unit. The display unit includes a plurality of pixel units, wherein at least one of the pixel units has a short side extended in a first direction and a long side extended in a second direction different from the first direction. The image conversion unit includes a lenticular lens and a first prism. The lenticular lens is overlapped with at least two of the pixel units arranged in the first direction, and is extended in the second direction. The first prism is corresponding to the lenticular lens and is arranged in the second direction.

A plurality of the first prisms is arranged in the second direction, and each of the first prisms may have a first right-angle triangle shape having an edge slanted from a first terminal portion of the lenticular lens toward a second terminal portion of the lenticular lens in the first direction. The length of at least one of the first prisms in the first direction may be substantially equal to a distance between the first terminal portion of the lenticular lens and the second terminal portion of the lenticular lens. The length of at least one of the first prisms in the second direction may be substantially half the length of the long side of the at least one pixel unit. The first prisms may not overlap with second prisms of a lenticular lens adjacent to the lenticular lens in the first direction.

The image conversion unit may further include a plurality of second prisms disposed adjacent to each of the first prisms. At least one of the second prisms may have a height different from the height of at least one of the first prisms at the first terminal portion of the lenticular lens, and the height of the at least one second prism may be gradually lower from the first terminal portion of the lenticular lens toward the second terminal portion of the lenticular lens. The length of each of the first prisms and the second prisms may be substantially one-third the length of the long side of the at least one pixel unit in the second direction. Each of the second prisms is disposed between a pair of the first prisms in the second direction and contacts a first prism of the pair of first prisms and is spaced apart from the other first prism of the pair of first prisms. Each of the first prisms may have a second right-angle triangle shape disposed along the second direction at the first terminal portion of the lenticular lens, and the first prisms are sequentially repeated along the second direction.

Each of the first prisms may have a first right-angle triangle shape having an edge slanted from a first terminal portion of the lenticular lens toward a center portion of the lenticular lens or an edge slanted from the center portion of the lenticular lens toward a second terminal portion of the lenticular lens, wherein the center portion of the lenticular lens is between the first terminal portion of the lenticular lens and the second terminal portion of the lenticular lens opposite to the first terminal portion. The length of each of the first prisms may be substantially half a distance between the first and second terminal portions of the lenticular lens in the first direction. The first prisms arranged in the second direction adjacent to the first terminal portion of the lenticular lens do not overlap with a plurality of the first prisms arranged in the second direction adjacent to the second terminal portion of the lenticular lens. The length of each of the first prisms in the second direction is three times the length of the long side of the at least one pixel unit. The length of each of the first prisms in the second direction is the same as the length of the long side of the at least one pixel unit.

The image conversion unit may further include a plurality of second prisms, a plurality of third prisms and a plurality of fourth prisms. The second prisms may be disposed in the second direction next to the first prisms. The second prisms may have a height different from the height of the first prisms at the first terminal portion of the lenticular lens, and the height of the second prisms may be gradually lower from the first terminal portion of the lenticular lens toward the center portion of the lenticular lens. The third prisms may be disposed in the first direction opposite the second prisms. The third prisms may have a height at the second terminal portion of the lenticular lens that is the same as the height of the second prisms at the first terminal portion of the lenticular lens, and the height of the third prisms may be gradually lower from the second terminal portion of the lenticular lens toward the center portion of the lenticular lens. The fourth prisms may be disposed in the second direction next to the third prisms. The fourth prisms may have a height at the second terminal portion of the lenticular lens that is the same as the height of the first prisms at the first terminal portion of the lenticular lens, and the height of the fourth prisms may be gradually lower from the second terminal portion of the lenticular lens toward the center portion of the lenticular lens. The length of each of the first, second, third and fourth prisms in the second direction is substantially twice the length of the long side of the at least one pixel unit.

Each of the first prisms may have a height that is gradually lower from the first terminal portion of the lenticular lens toward the second direction. A section of each of the first prisms may have a second right-angle triangle shape disposed along the second direction at the first terminal portion of the lenticular lens. Each of the first prisms may be sequentially repeated along the second direction. The image conversion unit may further include a plurality of second prisms having a height that is gradually higher from the second terminal portion of the lenticular lens toward the second direction. The second prisms may have a third right-angle triangle shape disposed along the second direction at the second terminal portion of the lenticular lens. The second prisms may be sequentially repeated along the second direction.

According to an exemplary embodiment of the present inventive concept, an image conversion unit for a stereoscopic image display device includes a lenticular lens having a short side extended in a first direction and a long side extended in a second direction different from the first direction, and a first prism disposed above or below the lenticular lens and arranged in the second direction, wherein a first area of a pixel unit is overlapped with the lenticular lens and a second area of the pixel unit is overlapped with the lenticular lens and the first prism, and wherein an image projected from the first area of the pixel unit onto a display panel is substantially unchanged and an image projected from the second area of the pixel unit onto the display panel is refracted.

According to an exemplary embodiment of the present inventive concept, a stereoscopic image display device includes a display unit that displays an image, wherein the display unit includes a plurality of pixels arranged in a matrix and classified by a light blocking layer, a backlight unit that applies light to the display unit, and a image conversion unit that converts a two-dimensional image displayed from the display unit into a three dimensional image, wherein the image conversion unit includes a plurality of lenticular lenses, wherein each lenticular lens is overlapped with at least two of the pixels in a first direction of the matrix and each lenticular lens is extended in a second direction of the matrix, the image conversion unit further includes a plurality of first prisms, wherein each first prism corresponds to one of the lenticular lenses and each first prism is arranged in the second direction of the matrix, wherein when a viewer views an area of the display unit corresponding to the light blocking pattern, the viewer views an image refracted by the first prisms.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EMBODIMENTS

Figure 1:
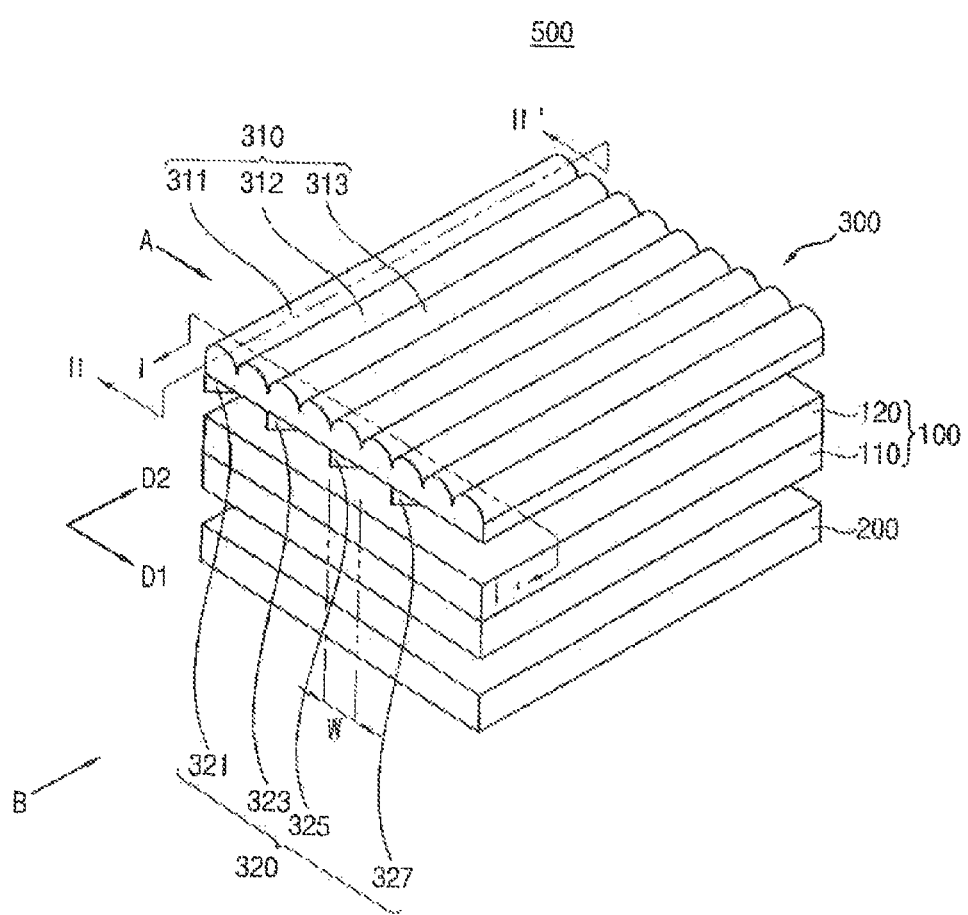
FIG. 1 is a perspective view illustrating a stereoscopic image display device in accordance with an exemplary embodiment of the present inventive concept.

Exemplary embodiments of the present inventive concept are described more fully hereinafter with reference to the accompanying drawings. The present inventive concept may, however, be embodied in many different forms and should not be construed as limited to the exemplary embodiments set forth herein. In the drawings, the sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present.

FIG. 1 is a perspective view illustrating a stereoscopic image display device in accordance with an exemplary embodiment of the present inventive concept.

Figure 2:
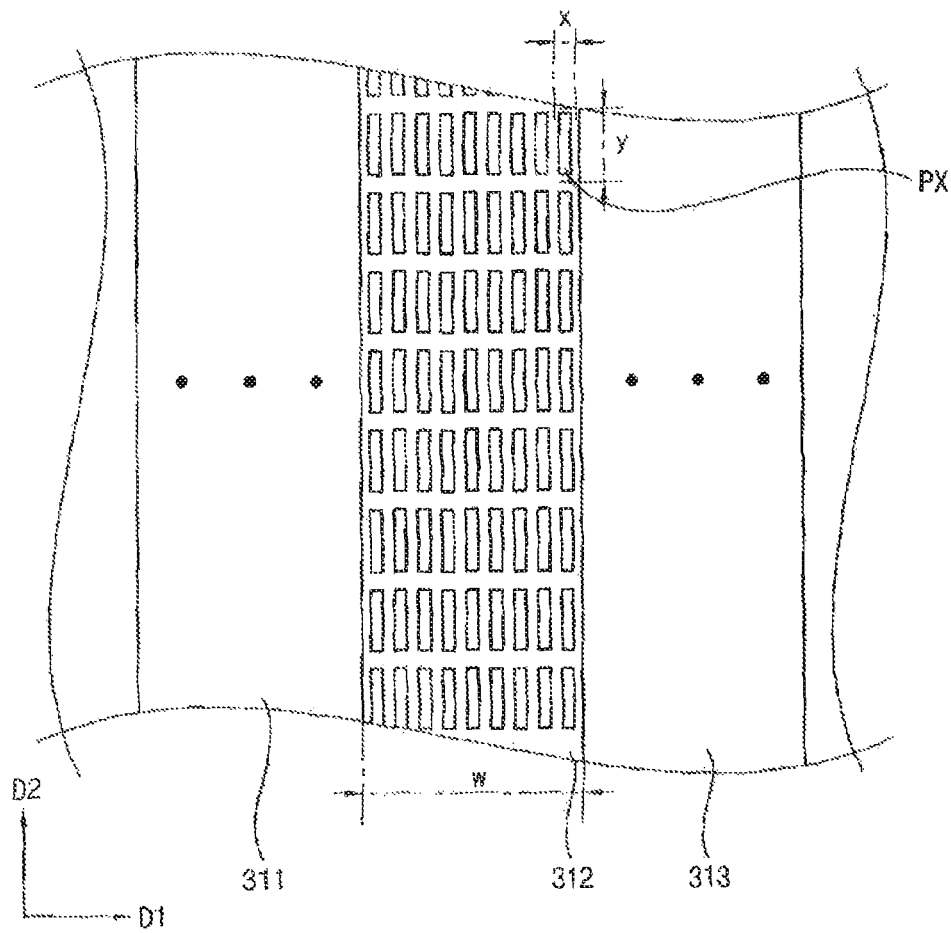
FIG. 2 is a plan view illustrating a relationship between a display unit and an image conversion unit of the stereoscopic image display device of FIG. 1.

FIG. 2 is a plan view illustrating a relationship between a display unit and an image conversion unit of the stereoscopic image display device of FIG. 1.

Referring to FIGS. 1 and 2, a stereoscopic image display device 500 includes a pixel/display unit 100 for displaying an image, a backlight unit 200 for applying light to the display unit 100, and an image conversion unit 300 for converting a two-dimensional (2D) image displayed from the display unit 100 into a three-dimensional (3D) image.

The display unit 100 includes a thin-film transistor (TFT) substrate 110, an opposite substrate 120 and a liquid crystal layer (not shown). The TFT substrate 110 may include a plurality of signal lines (not shown), a TFT (not shown) and a pixel electrode (not shown). The opposite substrate 120 may include a plurality of color filters (not shown) and a black matrix pattern (not shown). Alternatively, the color filters may be formed on the TFT substrate 110 not the opposite substrate 120.

A plurality of pixel units Px (as shown in FIG. 2) of the display unit 100 may be defined by the TFT substrate 110 and the opposite substrate 120. The pixel units Px may be classified by the signal lines and/or the black matrix pattern. Hereinafter, the signal lines and/or the black matrix pattern are defined as a light-blocking pattern. The light-blocking pattern includes a plurality of first stripes extended in a first direction D1 and a plurality of second stripes extended in a second direction D2 which crosses the first stripes. The first direction D1 and the second direction D2 cross each other. For example, the second direction D2 may be substantially perpendicular to the first direction D1.

Each of the pixel units Px includes a short side extended in the first direction D1 and a long side extended in the second direction D2. Each of the pixel units Px has a rectangle shape. A first length 'x' of the short side is defined as a distance from the center of one of the second stripes to the center of an adjacent second stripe. A second length 'y' of the long side is defined as a distance from the center of one of the first stripes to the center of an adjacent first stripe.

The pixel units Px are repeatedly arranged in the first direction D1 and the second direction D2. The pixel units Px may represent a color by the color filters formed on the TFT substrate 110 or the opposite substrate 120. When the color filters include a plurality of filter units representing red, green and blue colors, the pixel units Px may be classified as a pixel unit representing a red color, a pixel unit representing a green color and a pixel unit representing a blue color. The pixel units Px representing the red, the green and the blue colors may be sequentially repeated and arranged in the first direction D1. In addition, the pixel units Px representing the red, the green and the blue colors may be sequentially repeated and arranged in the second direction D2.

The backlight unit 200 is disposed below the display unit 100 to provide light to the display unit 100. The backlight unit 200 includes a light source (not shown) for generating light. For example, the light source may be a fluorescent lamp, light-emitting diode (LED), etc.

The image conversion unit 300 is disposed on the display unit 100. The image conversion unit 300 controls light transmitted through the display unit 100 to convert a 2D image displayed from the display unit 100 into a 3D image. The image conversion unit 300 includes a plurality of lenticular lenses 310 and a plurality of first prisms 320.

The lenticular lenses 310 are extended in the second direction D2, and are disposed substantially parallel with the first direction D1. Each of the lenticular lenses 310 overlaps with at least two pixel units Px arranged in the first direction D1. Each of the lenticular lenses 310 has a width 'w' defined as the length of the lenticular lens in the first direction D1. The width 'w' depends on the number of the pixel units Px overlapped with each of the lenticular lenses 310. In the present exemplary embodiment, each of the lenticular lenses 310 overlaps with nine pixel units Px. Accordingly, the width 'w' may have a value of nine times the first length 'x'. Each of the lenticular lenses 310 has a curved surface protruded from the display unit 100. Each of the lenticular lenses 310 may have a hemisphere shape. Hereinafter, a first viewed lenticular lens of the lenticular lenses 310 will be defined as a first lenticular lens 311 when viewed from a direction "A". A plurality of lenticular lenses of the lenticular lenses 310, which is sequentially disposed in the first direction D1 after the first lenticular lens 311, will be defined as a second lenticular lens 312 and a third lenticular lens 313.

The first prisms 320 are disposed in the second direction D2 in correspondence with each of the lenticular lenses 310. The image conversion unit 300 forms the lenticular lenses 310 by processing a surface of a plate. Simultaneously, the first prisms 320 are formed by processing the other surface of the plate. Accordingly, the lenticular lenses 310 and the first prisms 320 may be in an integrally formed structure. In an exemplary embodiment, a prism sheet having the first prisms 320 is manufactured independent of the lenticular lenses 310, and is combined with the lenticular lenses 310 to manufacture the image conversion unit 300.

Figure 5:
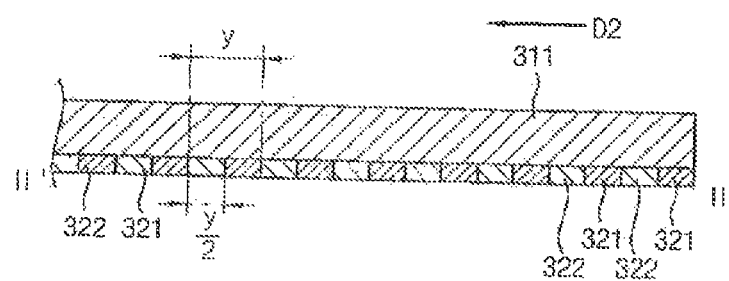
FIG. 5 is a cross-sectional view taken along line II-II' of FIG. 1.

Each of the first prisms 320 is slanted down from a first terminal portion of a lenticular lens 310 toward a second terminal portion of the lenticular lens 310 in the first direction D1. In other words, each of the first prisms 320 has a section having triangle shape that is disposed along the first direction D1. In the present exemplary embodiment, another section of the first prisms 320 has a rectangle shape that is disposed at the first terminal portion of the lenticular lens 310 in the second direction D2 (as shown in FIG. 5). The length of each of the first prisms 320 in the first direction D1 may be substantially the same as a length between the first terminal portion of the lenticular lens 310 and the second terminal portion of the lenticular lens 310. In other words, a width of each of the first prisms 320 may be substantially the same as a width 'w' of each of the lenticular lenses 310. The first prisms 320 are disposed below the lenticular lenses 310 in correspondence with each of the lenticular lenses 310.

Figure 3:
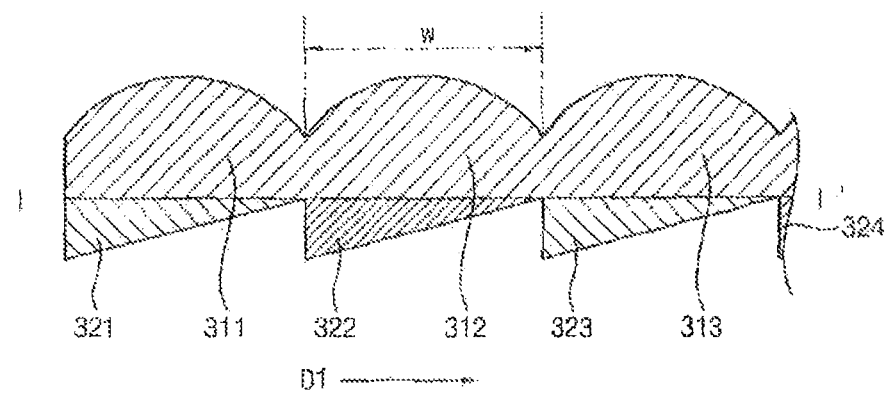
FIG. 3 is a cross-sectional view taken along line I-I' of FIG. 1.
Figure 4:
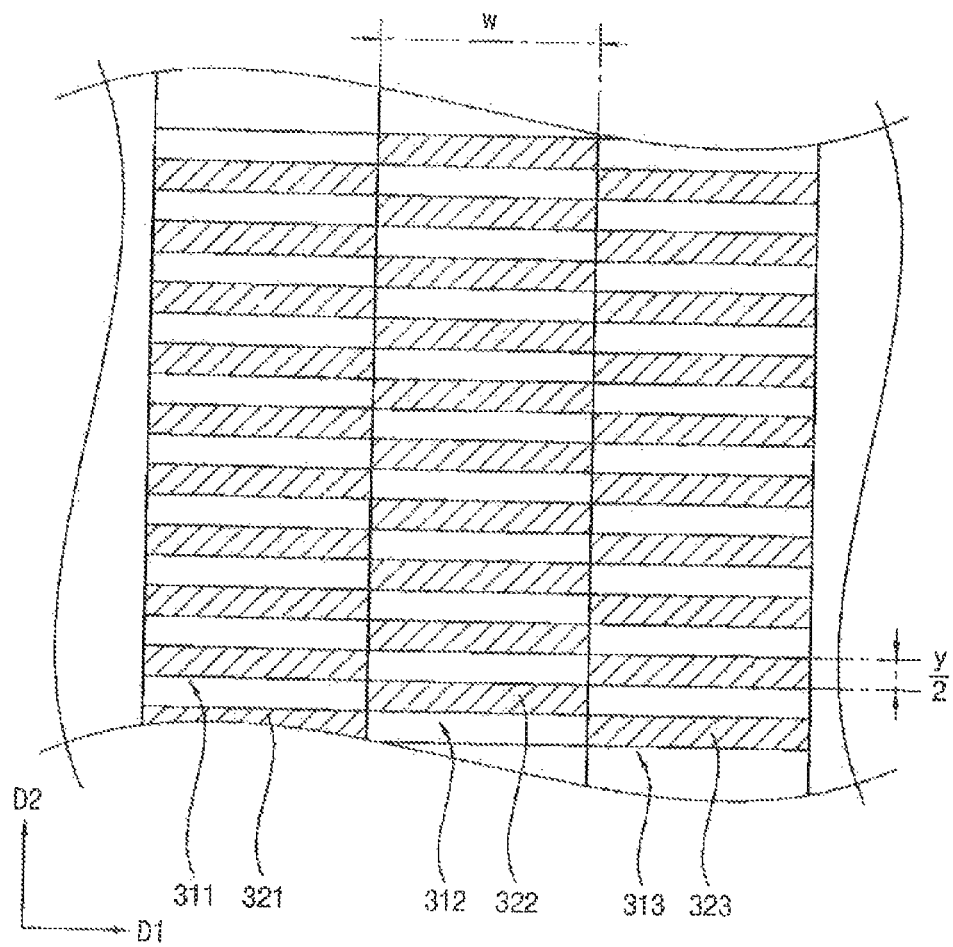
FIG. 4 is a back view illustrating the image conversion unit of FIG. 2.

Hereinafter, an image conversion unit of the present exemplary embodiment will be described as shown in FIGS. 3 to 5. The first prisms 320 corresponding to the first lenticular lens 311 may be defined as first sub-prisms 321. The first prisms 320 corresponding to the second lenticular lens 312 may be defined as second sub-prisms 322. The first prisms 320 corresponding to the third lenticular lens 313 may be defined as third sub-prisms 323. In other words, the first prisms 320 include the first, second and third sub-prisms 321, 322 and 323.

FIG. 3 is a cross-sectional view taken along line I-I' of FIG. 1. FIG. 4 is a back view illustrating the image conversion unit of FIG. 2.

Referring to FIGS. 1, 3 and 4, the first sub-prisms 321 are disposed below the first lenticular lens 311 in correspondence with the first lenticular lens 311. The second sub-prisms 322 are disposed below the second lenticular lens 312 in correspondence with the second lenticular lens 312. The third sub-prisms 323 are disposed below the third lenticular lens 313 in correspondence with the third lenticular lens 313.

The second sub-prisms 322 are not overlapped with the first sub-prisms 321. In addition, the third sub-prisms 323 are not overlapped with the second sub-prisms 322. An arrangement of the first sub-prisms 321 is substantially the same as an arrangement of the third sub-prisms 323. An arrangement of a plurality of fourth sub-prisms 324 corresponding to a fourth lenticular lens disposed in the first direction D1 and next to the third lenticular lens 313 is substantially the same as an arrangement of the second sub-prisms 322 (not shown). The second and the fourth sub-prisms 322 and 324 are actually disposed behind the first, the third, fifth and seventh sub-prisms 321, 323, 325 and 327 in the second direction D2. However, in FIG. 3, the second and the fourth sub-prisms 322 and 324 are shown with the first sub-prisms 321 when the image conversion unit 300 is viewed from the direction "B". The length of each of the first sub-prisms 321 in the first direction D1 may be substantially the same as a length between a first terminal portion and a second terminal portion of the first lenticular lens 311. A distance between the first sub-prisms 321 and the third sub-prisms 323 may be substantially the same as a width 'w' of the second lenticular lens 312.

FIG. 5 is a cross-sectional view taken along line II-II' of FIG. 1.

Referring to FIGS. 1, 4 and 5, the first sub-prisms 321 are spaced apart from each other in the second direction D2. A distance between the first sub-prisms 321 adjacent in the second direction D2 is substantially half the second length 'y'. The length of each of the first sub-prisms 321 in the second direction D2 may be substantially half the second length 'y'.

The second sub-prisms 322 are not overlapped with the first sub-prisms 321. Thus, when the image conversion unit 300 is viewed from the direction "A", the second sub-prisms 322 are actually disposed behind the first sub-prisms 321 in the first direction D1; however, the second sub-prisms 322 are shown with the first sub-prisms 321. In other words, the second sub-prisms 322 may be viewed between the first sub-prisms 321.

The height of the first prisms 320 is gradually lower from the first terminal portion of the lenticular lens 310 toward the second terminal portion of the lenticular lens 310, so that a section of the first prisms 320 has a rectangle shape when the first prisms 320 are disposed along the second direction D2 at the first terminal portion of the lenticular lens 310.

Figure 6A:
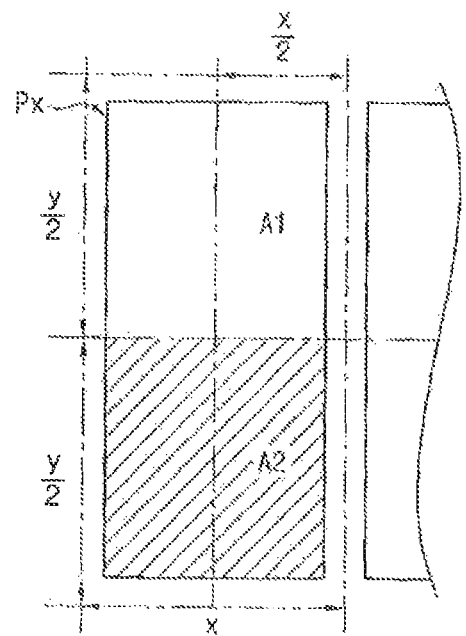
FIGS. 6A and 6B are plan views illustrating color mixing by the image conversion unit of FIG. 2 in accordance with an exemplary embodiment of the present inventive concept.
Figure 6B:
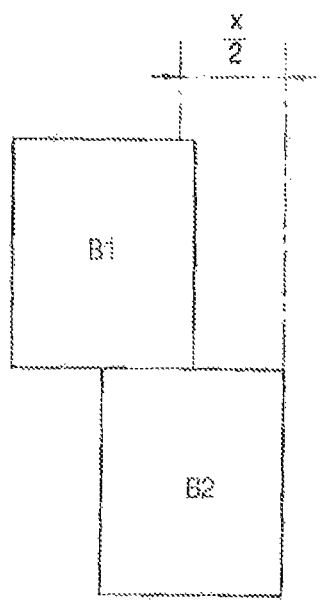

FIGS. 6A and 6B are plan views illustrating color mixing by the image conversion unit of FIG. 2 in accordance with an exemplary embodiment of the present inventive concept.

Referring to FIGS. 4 and 6A, a first area A1 of the pixel units Px is overlapped with the lenticular lenses 310. A second area A2, which is a remaining area of the pixel units Px excluding the first area A1, is overlapped with the lenticular lenses 310 and the first prisms 320. Thus, each of the pixel units Px is divided by the first prisms 320 into two pixel units in the second direction D2.

Referring to FIGS. 6A and 6B, the first area A1 corresponds to the lenticular lenses 310, so that a viewer may view an image displayed from the first area A1 on a third area B1 that is substantially identical to the first area A1.

The second area A2 is overlapped with the lenticular lenses 310 and the first prisms 320, so that an image of the display unit 100 is refracted by passing through the first prisms 320. Thus, a viewer may view an image displayed from the second area A2 on a fourth area B2 moved from the second area A2 by a predetermined distance. The predetermined distance may be substantially half the first length 'x'.

For example, displaying an image on the first and second areas A1 and A2 of the display unit 100 is substantially identical to displaying an image on the third and the fourth areas B1 and B2 by the first prisms 320. Thus, when a viewer views the display unit 100 from an area having the light-blocking pattern, the viewer views an image displayed from the area B2 moved by the predetermined distance due to the first prisms 320.

Thus, a viewer may simultaneously view a color of the pixel units Px at any point of the display unit 100. Thus, the viewer may be prevented from viewing a moiré pattern when shown the light-blocking pattern at a specific position of the display unit 100.

Figure 7:
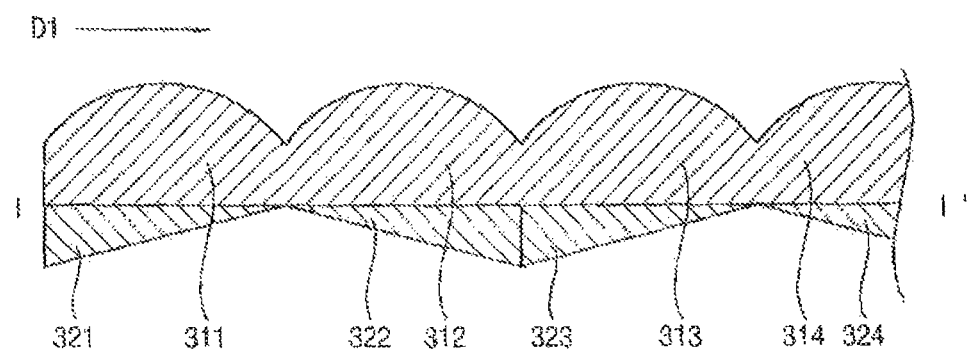
FIG. 7 is a cross-sectional view illustrating an arrangement of a prism in accordance with an exemplary embodiment of the present inventive concept.

FIG. 7 is a cross-sectional view illustrating an arrangement of a prism in accordance with an exemplary embodiment of the present inventive concept.

Referring to FIG. 7, unlike an arrangement of the first prisms 320 as shown in FIG. 3, the first sub-prisms 321 may be arranged in a direction different from the second sub-prisms 322. The height of the first sub-prisms 321 is gradually lower from the first terminal portion of the first lenticular lens 311 toward the second terminal portion of the first lenticular lens 311. The height of the second sub-prisms 322 may be gradually lower from the second terminal portion of the second lenticular lens 312 toward the first terminal portion of the second lenticular lens 312.

The height of the third sub-prisms 323 is gradually lower from the first terminal portion of the third lenticular lens 313 toward the second terminal portion of the third lenticular lens 313. In addition, the height of the fourth sub-prisms 324 is gradually lower from the second terminal portion of the fourth lenticular lens 314 toward the first terminal portion of the fourth lenticular lens 314.

When the first sub-prisms 320 have an arrangement as shown in FIG. 7, the present exemplary embodiment is substantially identical to the embodiment of FIGS. 6A and 6B where an image of the second area A2 of the pixel units Px is moved by a predetermined distance to be displayed due to the first prisms 320. Accordingly, any further description related thereto will be omitted.

Although not shown in FIG. 7, the first prisms 320 may be disposed on the lenticular lenses 310. For example, a prism sheet having the first prisms 320 is manufactured independent of the lenticular lenses 310, and then is combined on the lenticular lenses 310 to manufacture the image conversion unit 300. The first prisms 320 may be stably disposed between the lenticular lenses 310. Except that the first prisms 320 are disposed on the lenticular lenses 310, the present exemplary embodiment is substantially identical to the embodiments as shown in FIGS. 1 to 7 where the first prisms 320 are disposed below the lenticular lenses 310. Accordingly, any further description of the present exemplary embodiment will be omitted.

Figure 8:
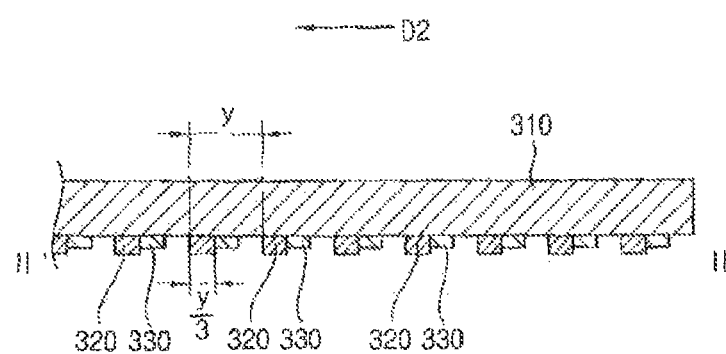
FIG. 8 is a cross-sectional view illustrating an image conversion unit in accordance with an exemplary embodiment of the present inventive concept.

FIG. 8 is a cross-sectional view illustrating an image conversion unit in accordance with an exemplary embodiment of the present inventive concept.

A stereoscopic image display device according to the present exemplary embodiment is substantially identical to the stereoscopic image display device described in FIG. 1 except for the image conversion unit described in FIG. 8. Accordingly, any further description of the substantially identical components will be omitted. For example, FIG. 8 is a cross-sectional view illustrating an image conversion unit disposed along the second direction D2 of FIG. 1.

Referring to FIGS. 3 and 8, the image conversion unit 300 according to the present exemplary embodiment includes the lenticular lenses 310, the first prisms 320 and second prisms 330.

Each of the lenticular lenses 310 is extended in the second direction D2. The first prisms 320 are arranged in the second direction D2 in correspondence with each of the lenticular lenses 310. The first prisms 320 have a first height at a first terminal portion of the lenticular lens 310. The height of the first prisms 320 is gradually lower from the first terminal portion of the lenticular lens 310 toward the second terminal portion of the lenticular lens 310 in the first direction D1. The second prisms 330 have a second height different from the first height at the first terminal portion of the lenticular lens 310. For example, the second height may be lower than the first height. The second prisms 330 are disposed between the first prisms 320 adjacent to each other. The height of the second prisms 330 is gradually lower from the first terminal portion of the lenticular lens 310 toward the second terminal portion of the lenticular lens 310 in the first direction D1.

The length of each of the first prisms 320 and the second prisms 330 in the second direction D2 may be substantially one-third of the second length 'y'. The second prisms 330 are disposed in the second direction D2 with respect to the first prisms 320. Each of the second prisms 330 contacts with one of the first prisms 320 disposed in the second direction D2. Each of the second prisms 330 is spaced apart from one of the first prism 320 disposed behind the second prism 330 by a predetermined distance. The predetermined distance may be substantially one-third of the second length 'y'.

A third area of the pixel units Px is overlapped with the lenticular lens 310. A fourth area adjacent to the third area is overlapped with the lenticular lens 310 and the second prism 330. A fifth area adjacent to the fourth area is overlapped with the lenticular lens 310 and the first prism 320. Accordingly, each of the pixel units Px is divided by the first prism 320 and the second prism 330 into three-pixel units in the second direction D2.

In the present exemplary embodiment, all of the first, the second and the third lenticular lenses 311-313 may have the arrangement of the first and second prisms 320 and 330 described in FIG. 8. Alternatively, the first lenticular lens 311 may have the arrangement of the first and second prisms 320 and 330 described in FIG. 8; however, the arrangement of the first and second prisms 320 and 330 corresponding to the second lenticular lens 312 may be opposite the arrangement described in FIG. 8. In addition, the first and second prisms 320 and 330 corresponding to the third lenticular lens 313 may have the arrangement described in FIG. 8.

Figure 9:
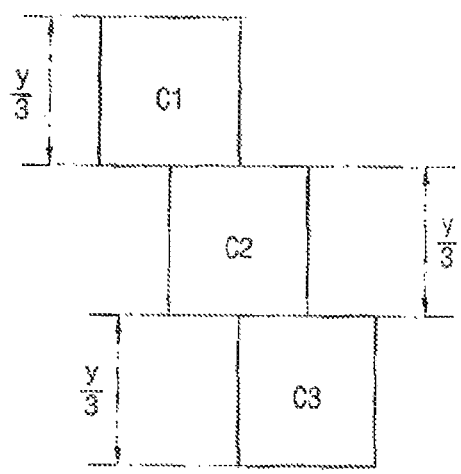
FIG. 9 is plan view illustrating color mixing by the image conversion unit of FIG. 8 in accordance with an exemplary embodiment of the present inventive concept.

FIG. 9 is plan view illustrating color mixing by the image conversion unit of FIG. 8 in accordance with an exemplary embodiment of the present inventive concept.

Referring to FIG. 9, the third area is corresponding to the lenticular lens 310, so that a viewer may view an image displayed on the third area at a sixth area C1 substantially identical to the third area.

The fourth area is corresponding to the lenticular lens 310 and the second prism 330, so that an image of the display unit 100 is refracted by passing through the second prism 330. Accordingly, a viewer may view an image displayed from the fourth area on a seventh area C2 moved from the fourth area by a predetermined distance. The predetermined distance may be substantially one-third of the first length 'x'.

The fifth area is corresponding to the lenticular lens 310 and the first prism 320, so that an image of the display unit 100 is refracted by passing through the first prism 310. Accordingly, a viewer may view an image displayed from the fifth area on an eighth area C3 moved from the fourth area by a predetermined distance. The predetermined distance may be substantially two-thirds of the first length 'x'.

Thus, when a viewer views the display unit 100 from an area having the light-blocking pattern, the viewer views an image displayed from the area C3 moved by the predetermined distance due to the first prisms 310 and the second prisms 320. The first prisms 320 and the second prisms 330 according to the present exemplary embodiment may divide an area of each of the pixel units Px more than the embodiment described in FIG. 5. Thus, a generation of a moiré pattern may be reduced more than the embodiment described in FIG. 5.

Figure 10:
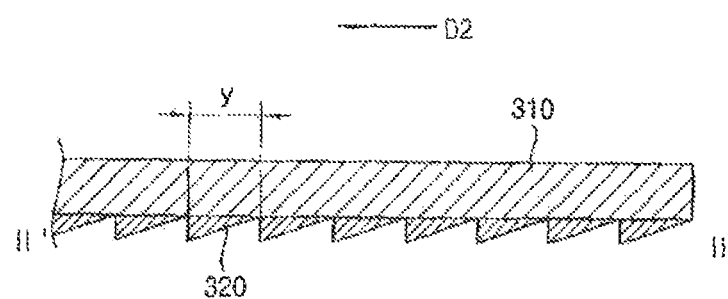
FIG. 10 is a cross-sectional view illustrating an image conversion unit in accordance with an exemplary embodiment of the present inventive concept.

FIG. 10 is a cross-sectional view illustrating an image conversion unit in accordance with an exemplary embodiment of the present inventive concept.

A stereoscopic image display device according to the present exemplary embodiment is substantially identical to the stereoscopic image display device described in FIG. 1 except for the image conversion unit described in FIG. 10. Accordingly, any further description of the substantially identical components will be omitted. For example, FIG. 10 is a cross-sectional view illustrating an image conversion unit disposed along the second direction D2 of FIG. 1.

Referring to FIG. 10, the image conversion unit 300 according to the present exemplary embodiment includes the lenticular lenses 310 and the first prisms 320. The lenticular lenses 310 are arranged in the first direction D1, and are extended in the second direction D2 different from the first direction D1. The first prisms 320 are arranged in the second direction D2 in correspondence with each of the lenticular lenses 310. The first prisms 320 are sequentially repeated along the second direction D2.

Figure 11:
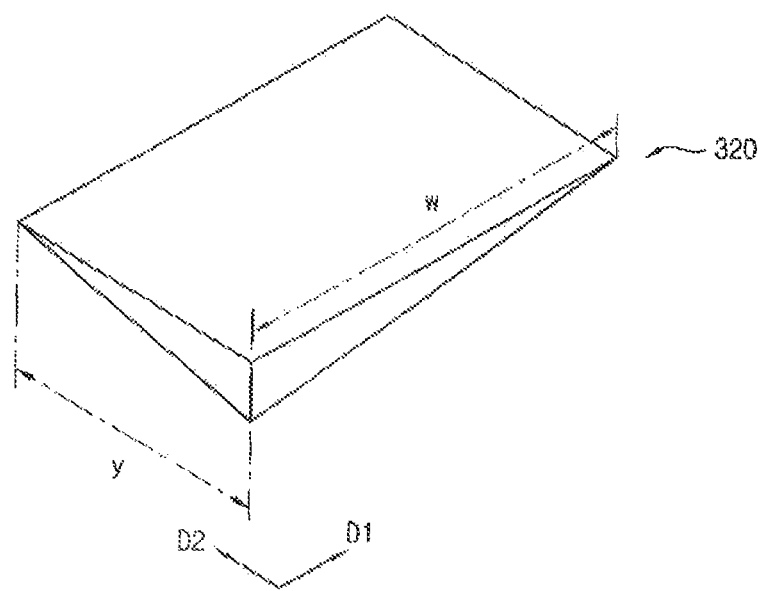
FIG. 11 is a perspective view illustrating a prism of FIG. 10.

FIG. 11 is a perspective view illustrating the first prism 320 of FIG. 10.

Referring to FIG. 11, a section of the first prism 320 has a right-angle triangle shape that is disposed along the first direction D1. The height of the first prism 320 is gradually lower from a first terminal portion of the lenticular lens 310 toward a second terminal portion of the lenticular lens 310, which is opposite to the first terminal portion of the lenticular lens 310 in the first direction D1. Simultaneously, a section of the first prism 320 has a right-angle triangle shape that is disposed along the second direction D2 at the first terminal portion of the lenticular lens 310. The height of the first prism 320 is gradually lower in the second direction D2. Thus, each of the first prisms 320 has two sections having a right-angle triangle shape. The size of the right-angle triangle shapes is reduced crossing the first prisms 320 in the first and second directions D1 and D2, respectively, and finally, the sections with the right-angle triangle shapes converge into a line. A section of the first prism 320 has a line shape that is disposed along the second direction D2 at the second terminal portion of the lenticular lens 310. The length of the first prism 320 in the second direction D2 is same as the second length 'y'.

The first prisms 320 according to the present exemplary embodiment may divide an area of each of the pixel units Px more than the embodiment described in FIG. 8. In other words, an area of each of the pixel units Px is divided into three-areas in FIG. 8. An area of each of the pixel units Px can be divided into an infinite quantity with the first prism 320 of FIG. 10. Thus, a generation of a moiré pattern may be reduced more than the embodiment described in FIG. 8.

Figure 12:
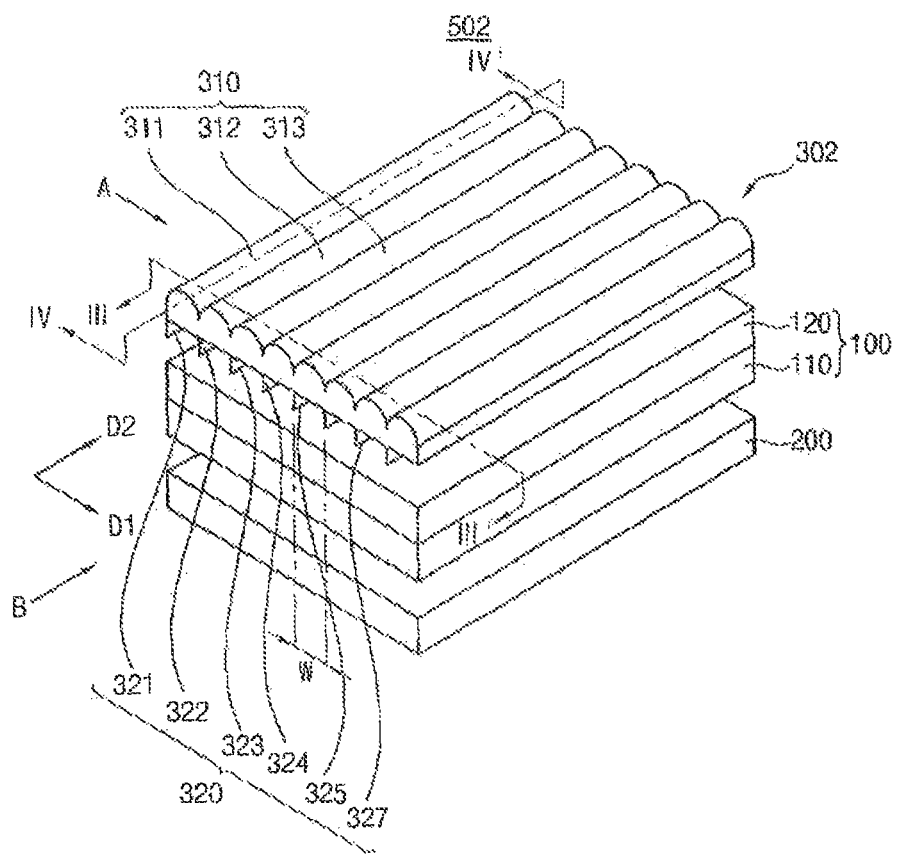
FIG. 12 is a perspective view illustrating a stereoscopic image display device in accordance with an exemplary embodiment of the present inventive concept.
Figure 13:
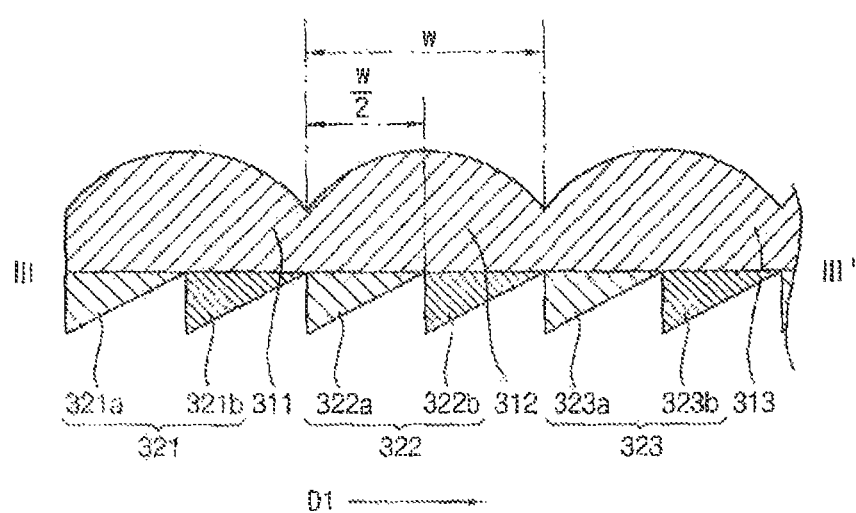
FIG. 13 is a cross-sectional view taken along line III-III' of FIG. 12.
Figure 14:
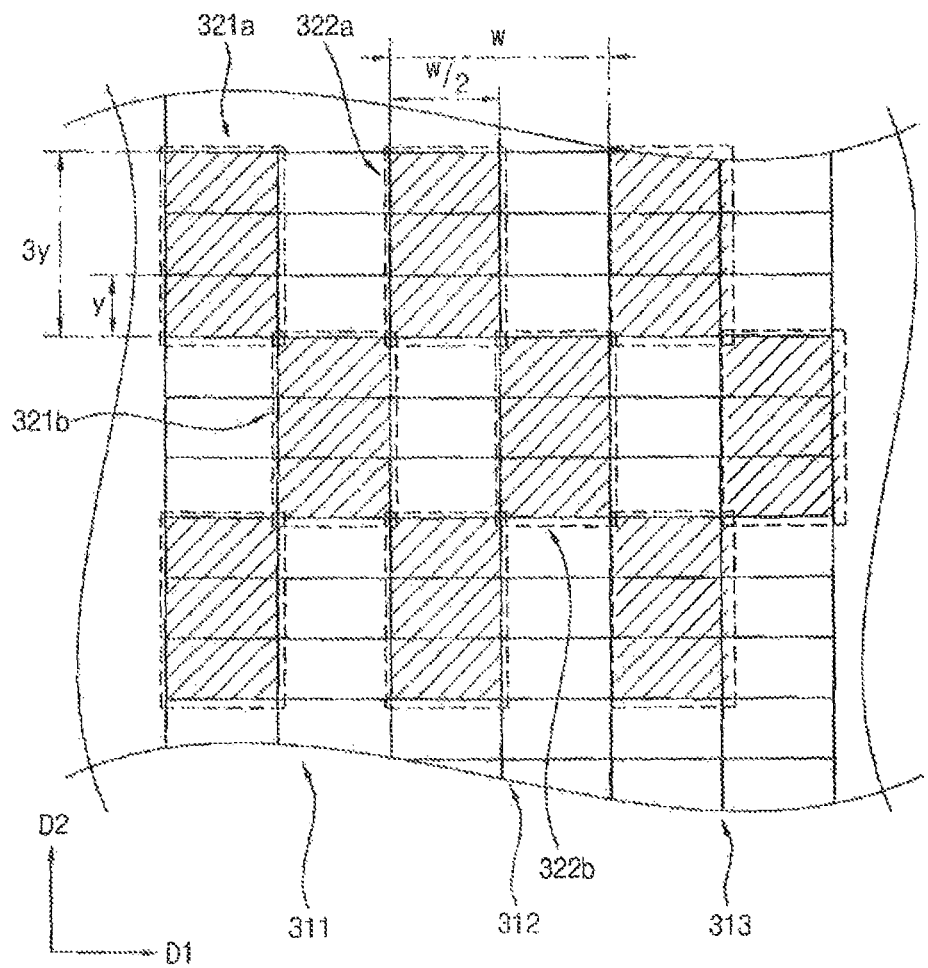
FIG. 14 is a back view illustrating an image conversion unit for explaining an arrangement of a prism of FIG. 12.

FIG. 12 is a perspective view illustrating a stereoscopic image display device in accordance with an exemplary embodiment of the present invention. FIG. 13 is a cross-sectional view taken along line III-III' of FIG. 12. FIG. 14 is a back view illustrating an image conversion unit for explaining an arrangement of a prism of FIG. 12.

Referring to FIGS. 12, 13 and 14, a stereoscopic image display device 502 according to the present exemplary embodiment includes a pixel/display unit 100, a backlight unit 200 for applying light to the display unit 100, and an image conversion unit 302 for converting a 2D image displayed from the display unit 100 to a 3D image. The stereoscopic image display device according to the present exemplary embodiment is substantially identical to the stereoscopic image display device described in FIG. 1 except for the image conversion unit 302. Accordingly, any further description of the substantially identical components will be omitted.

The image conversion unit 302 includes the lenticular lenses 310 and the first prisms 320.

The lenticular lenses 310 are extended in the second direction D2, and are arranged substantially parallel with the first direction D1. Each of the lenticular lenses 310 is overlapped with at least two-pixel units Px arranged in the first direction D1. Each of the lenticular lenses 310 has a width 'w' defined as a length of the lenticular lens 310 in the first direction D1. The width 'w' is a length between a first terminal portion of the lenticular lens 310 and a second terminal portion of the lenticular lens 310, which is opposite to the first terminal portion of the lenticular lens 310 in the first direction D1.

The first prisms 320 are arranged in the second direction D2 in correspondence with each of the lenticular lenses 310. Each of the first prisms 320 is slanted down from the first terminal portion of the lenticular lens 310 toward a center portion of the lenticular lens 310 or is slanted down from the center portion of the lenticular lens 310 toward the second terminal portion of the lenticular lens 310. For example, the length of each of the first prisms 320 may be substantially half the width 'w' in the first direction D1.

Figure 15:
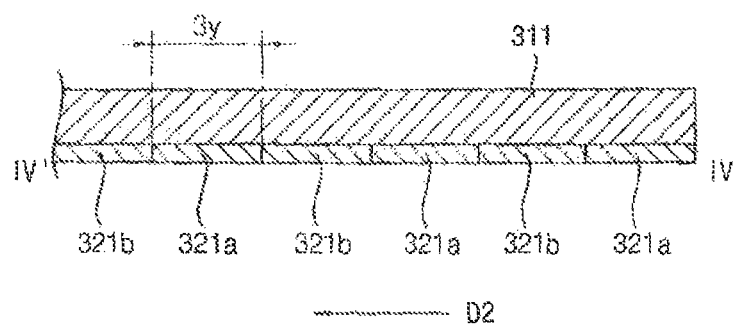
FIG. 15 is a cross-sectional view taken along line IV-IV' of FIG. 12.

A section of each of the first prisms 320 has a right-angle triangle shape that is disposed along the first direction D1. A section of the first prisms 320 has a rectangle shape that is disposed at the first terminal portion of the lenticular lens 310 (as shown in FIG. 15). A section of the first prisms 320 has a line shape that is disposed at the second terminal portion of the lenticular lens 310. The first prisms 320 are disposed below the lenticular lenses 310 in correspondence with each of the lenticular lenses 310. When the first prisms 320 of each of the lenticular lenses 310 are viewed from the direction "A" in FIG. 15, and the first prisms 320 are disposed below the lenticular lenses 310.

The first prisms 320 include a plurality of first sub-prisms 321, a plurality of second sub-prisms 322 and a plurality of third sub-prisms 323. The first sub-prisms 321 are disposed below the first lenticular lens 311 in correspondence with the first lenticular lens 311. The second sub-prisms 322 are disposed below the second lenticular lens 312 in correspondence with the second lenticular lens 312. The third sub-prisms 323 are disposed below the third lenticular lens 313 in correspondence with to the third lenticular lens 313.

The first sub-prisms 321 are spaced apart from each other along the first terminal portion of the first lenticular lens 311 by a predetermined distance to form a first row pattern, and are spaced apart from each other along the second terminal portion of the first lenticular lens 311 by a predetermined distance to form a second row pattern. First sub-prisms 321a having the first row pattern are defined as first row first sub-prisms. First sub-prisms 321b having the second row pattern are defined as second row first sub-prisms. The first row first sub-prisms 321a are not overlapped with the second row first sub-prisms 321b.

The second sub-prisms 322 are spaced apart from each other along the first terminal portion of the second lenticular lens 312 by a predetermined distance to form a third row pattern, and are spaced apart from each other along the second terminal portion of the second lenticular lens 312 by a predetermined distance to form a fourth row pattern. Second sub-prisms 322a having the third row pattern are defined as first row second sub-prisms. Second sub-prisms 322b having the fourth row pattern are defined as second row second sub-prisms. The first row second sub-prisms 322a are not overlapped with the second row second sub-prisms 322b. In addition, the first row second sub-prisms 322a are not overlapped with the second row first sub-prisms 321a.

In addition, the third sub-prisms 323 are spaced apart from each other along the first terminal portion of the third lenticular lens 313 by a predetermined distance to form a fifth row pattern, and are spaced apart from each other along the second terminal portion of the third lenticular lens 313 by a predetermined distance to form a sixth row pattern. The third sub-prisms 323 are substantially identical to the first sub-prisms 313. Accordingly, any further description of the third sub-prisms 323 will be omitted.

When the image conversion unit 302 is viewed from the direction "A", the second row first sub-prisms 321b are disposed behind the first row first sub-prisms 321a in the first direction D1; however, the first row first sub-prisms 321a are not overlapped with the second row first sub-prisms 321b so that the second row first sub-prisms 321b and the first row first sub-prisms 321a may be viewed (as shown in FIG. 15).

FIG. 15 is a cross-sectional view taken along line IV-IV' of FIG. 12.

Referring to FIGS. 14 and 15, the length of each of the first and second row first sub-prisms 321a and 321b may be three times the second length 'y' in the second direction D2. The first row first sub-prisms 321a adjacent to each other may be spaced apart from each other by three times the second length 'y'. In addition, the length of each of the first and second row second sub-prisms 322a and 322b may be three times the second length 'y' in the second direction D2. In other words, each of the first and second row first sub-prisms 321a and 321b may be overlapped with three-pixel units Px in the second direction D2.

The two three-pixel units Px arranged in the second direction D2 are defined as a unit, and the unit is divided by the first and second row first sub-prisms 321a and 321b into two-units in the first direction D1. Accordingly, a viewer may view an image displayed from area having the first or the second row first sub-prisms 321a and 321b from an area moved by a predetermined distance from the area having the first or the second row first sub-prisms 321a and 321b. When a viewer views the display unit 100 from an area having the light-blocking pattern, the viewer views an image displayed from the area moved by the predetermined distance due to the first prisms 320. In other words, a viewer may simultaneously view a color of the pixel units Px at any point of the display unit 100. Accordingly, the viewer may be prevented from viewing a moiré pattern when shown the light-blocking pattern at a specific position of the display unit 100.

Figure 16:
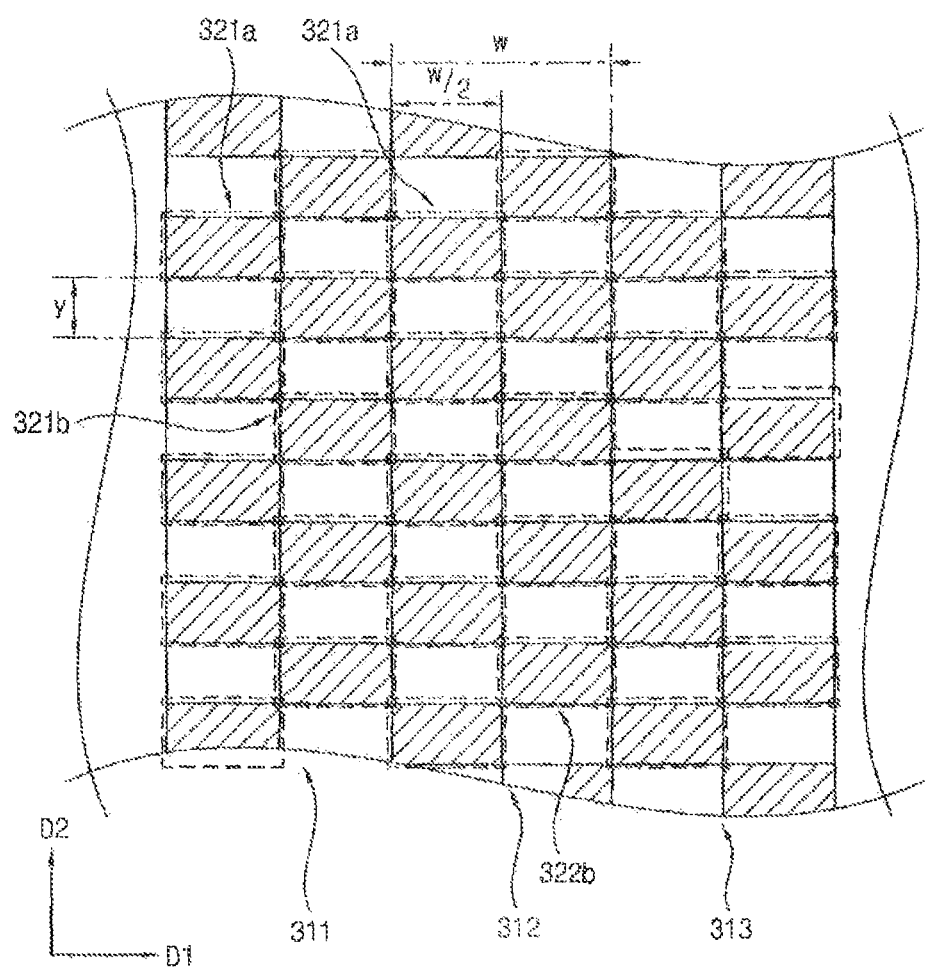
FIG. 16 is a back view illustrating an arrangement of a prism in accordance with an exemplary embodiment of the present inventive concept.

FIG. 16 is a back view illustrating an arrangement of a prism in accordance with an exemplary embodiment of the present inventive concept.

Referring to FIG. 16, the length of each of the first and second row first sub-prisms 321a and 321b may be the same as the second length 'y' in the second direction D2. The first row first sub-prisms 321a adjacent to each other may be spaced apart from each other by the second length 'y'. In addition, the length of each of the first and second row second sub-prisms 322a and 322b may be same as the second length 'y' in the second direction D2. In other words, each of the first and second row first sub-prisms 321a and 321b may be overlapped with one-pixel unit Px in the second direction D2.

The first prisms 320 may be disposed on the lenticular lenses 310 (not shown). Except that the first prisms 320 are disposed on the lenticular lenses 310, the present exemplary embodiment is substantially identical to the embodiment as shown in FIGS. 12 to 19 where the first prisms 320 are disposed below the lenticular lenses 310. Accordingly, any further description related thereto will be omitted.

Figure 17A:
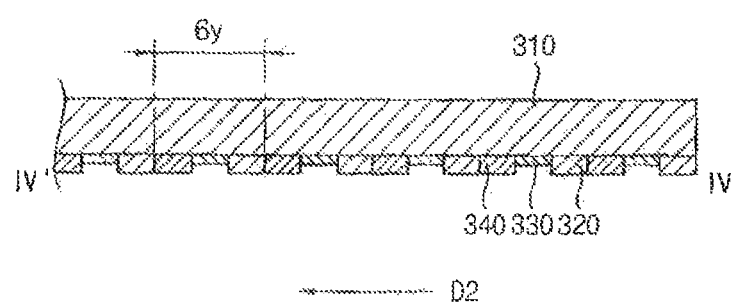
FIG. 17A is a cross-sectional view illustrating an image conversion unit in accordance with an exemplary embodiment of the present inventive concept.
Figure 17B:
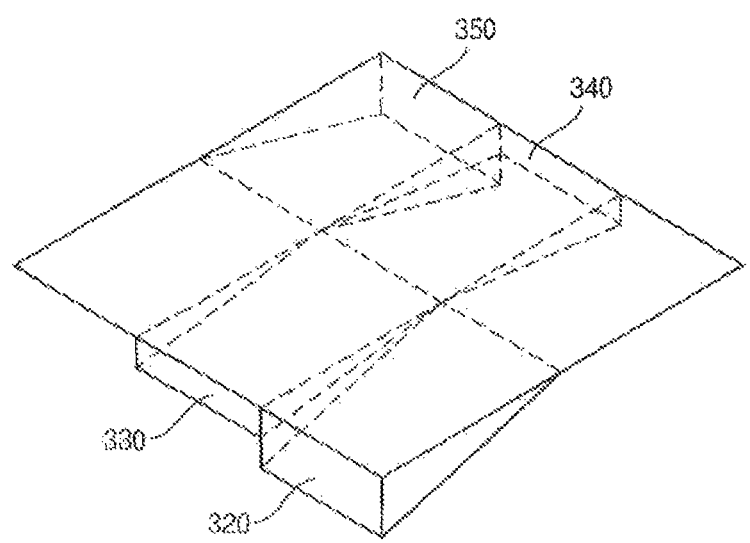
FIG. 17B is a perspective view illustrating a prism of FIG. 17A.

FIG. 17A is a cross-sectional view illustrating an image conversion unit in accordance with an exemplary embodiment of the present inventive concept. FIG. 17B is a perspective view illustrating a prism of FIG. 17A.

The stereoscopic image display device according to the present exemplary embodiment is substantially identical to the stereoscopic image display device described in FIG. 12 except for the image conversion unit described in FIGS. 17A and 17B. Accordingly, any further description of the substantially identical components will be omitted. FIG. 17A is a cross-sectional view illustrating an image conversion unit disposed along the second direction of FIG. 12. Referring to FIGS. 12, 17A and 17B, the image conversion unit 302 according to the present exemplary embodiment includes the lenticular lenses 310, the first prisms 320, the second prisms 320, third prisms 340 and fourth prisms 350.

The lenticular lenses 310 are extended in the second direction D2. The first prisms 320 are arranged in the second direction D2 in correspondence with the lenticular lenses 310.

The first prisms 320 have a first height at the first terminal portion of the lenticular lenses 310. The height is gradually lower from the first terminal portion of the lenticular lenses 310 toward the center portion of the lenticular lenses 310. The second prisms 330 are disposed in the second direction D2 next to the first prisms 320. The height of the second prisms 330 is gradually lower from the first terminal portion of the lenticular lenses 310 toward the center portion of the lenticular lenses 310. The second prisms 330 have a second height different from the first height at the first terminal portion of the lenticular lenses 310. For example, the second height may be lower than the first height. Each of the second prisms 330 is disposed between the first sub-prisms 320 adjacent to each other.

The third prisms 340 are disposed in the first direction D1 opposite the second prisms 330. The first direction D1 crosses the second direction D2. The third prisms 340 have the second height at the second terminal portion of the lenticular lenses 310, and the height is gradually lower from the second terminal portion of the lenticular lenses 310 toward the center portion of the lenticular lenses 310. The fourth prisms 350 are disposed in the second direction D2 next to the third prisms 340. The fourth prisms 350 are disposed in a diagonal direction with the first prisms 320. The diagonal direction may be a direction between the first direction D1 and the second direction D2. The fourth prism 350 has the first height at the second terminal portion of the lenticular lenses 310. The height of the fourth prisms 350 is gradually lower from the second terminal portion of the lenticular lenses 310 toward the center portion of the lenticular lenses 310. When a viewer views the first prism 320 from the direction "A" of FIG. 12, the viewer can not view the third prism 340 because the third prism 340 is shielded by the second prism 330.

When the length of the first prism 320 is six times the second length 'y' in the second direction D2, the length of each of the first to the fourth prisms 320, 330, 340 and 350 may be two times of the second length 'y' in the second direction D2. An area having the six pixel units Px may be divided into three areas in the second direction D2 by the first to fourth prisms 320, 330, 340 and 350.

Figure 18:
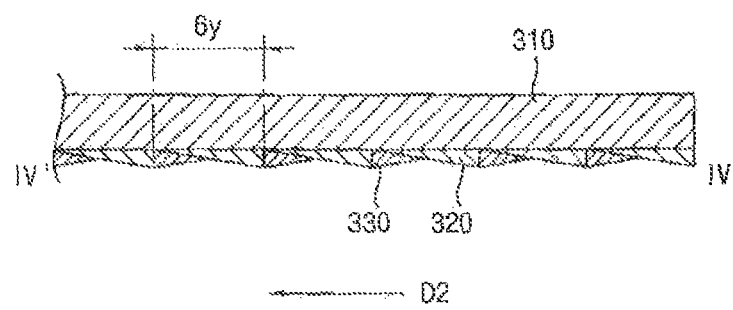
FIG. 18 is a cross-sectional view illustrating an image conversion unit in accordance with an exemplary embodiment of the present inventive concept.

FIG. 18 is a cross-sectional view illustrating an image conversion unit in accordance with an exemplary embodiment of the present inventive concept.

The stereoscopic image display device according to the present exemplary embodiment is substantially identical to the stereoscopic image display device described in FIG. 12 except for the image conversion unit described in FIG. 18. Accordingly, any further description of the substantially identical components will be omitted. In addition, since FIG. 18 is a cross-sectional view taken along line IV-IV' of FIG. 12, a first lenticular lens is only described. The plurality of lenticular lenses in FIG. 12 may be substantially identical to the first lenticular lens described here. Accordingly, any further description of the extra lenses will be omitted.

Referring to FIG. 18, the image conversion unit 302 according to the present exemplary embodiment includes the lenticular lenses 310, the first prisms 320 and the second prisms 330. The lenticular lenses 310 are disposed in the first direction D1, and are extended in the second direction D2 different from the first direction D1. The first prisms 320 and the second prisms 330 are disposed in the second direction D2 in correspondence with each of the lenticular lenses 310. The first prisms 320 and the second prisms 330 are sequentially repeated along the second direction D2.

Figure 19:
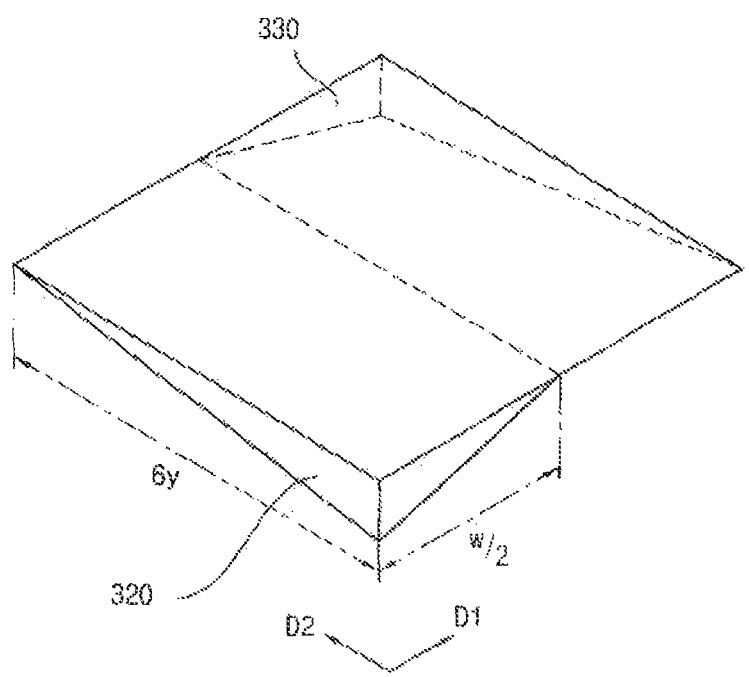
FIG. 19 is a perspective view illustrating a prism of FIG. 18.

FIG. 19 is a perspective view illustrating the prisms of FIG. 18.

Referring to FIG. 19, a section of the first prism 320 has a right-angle triangle shape that is disposed along the first direction D1. The height of the first prism 320 is gradually lower from a first terminal portion of the lenticular lens 310 toward a center portion of the lenticular lens 310 between the first terminal portion of the lenticular lens 310 and a second terminal portion of the lenticular lens 310, which is opposite to the first terminal portion of the lenticular lens 310 in the first direction D1. Simultaneously, a section of the first prism 320 has a right-angle triangle shape that is disposed along the second direction D2 at the first terminal portion of the lenticular lens 311. The height of the first prism 320 is gradually lower in the second direction D2. Thus, each of the first prisms 320 has two sections having a right-angle triangle shape. The size of the right-angle triangle shapes is reduced crossing the first prisms 320 in the first and second directions D1 and D2, respectively, and finally, the sections with the right-angle triangle shapes converge into a line. The length of the first prism 320 may be six times the second length 'y' in the second direction D2.

A section of the second prism 330 has a right-angle triangle shape that is disposed along the first direction D1. The height of the second prism 330 is gradually higher from the center portion of the lenticular lens 310 toward the second terminal portion of the lenticular lens 310 in the first direction D1. Simultaneously, a section of the second prism 330 has a right-angle triangle shape that is disposed along the second direction D2 at the second terminal portion of the lenticular lens 310. The height of the second prism 330 is gradually higher from the second terminal portion of the lenticular lens 310 in the second direction D2. Thus, each of the second prisms 330 has two sections having a right-angle triangle shape. The size of the right-angle triangle shapes is reduced crossing the second prisms 330 in the reverse first and second directions D1 and D2, respectively, and finally, the sections with the right-angle triangle shapes converge into a line. The second prisms 330 are sequentially repeated in the second direction D2. A shape of each of the first and second prisms 320 and 330 is same. However, the first prism 320 and the second prism 330 are disposed in point symmetry to each other with respect to the center portion of the lenticular lens 310. The length of the second prisms 330 may be six times the second length 'y' in the second direction D2.

The first prisms 320 and the second prisms 330 according to the present exemplary embodiment may divide an area more than the embodiment described in FIGS. 17A and 17B. In other words, an area having the six pixel units Px is divided into three areas in FIGS. 17A and 17B. An area having the six pixel units Px may be divided into an infinite quantity in FIGS. 18 and 19. Thus, a generation of a moiré pattern may be reduced more than the embodiment described in FIGS. 17A and 17B.

According to the exemplary embodiments of the present inventive concept, by using an image conversion unit having a prism, a viewer may simultaneously view a color of a pixel unit and a colorless light-blocking pattern, which classifies the pixel units, at any point on a display panel. Thus, the viewer may view color images on the entire display panel. Accordingly, the viewer may be prevented from viewing a moiré pattern when shown the light-blocking pattern at a specific position on the display panel.

The stereoscopic image display device according to the exemplary embodiments of the present inventive concept may be applied to a liquid crystal display (LCD) device, a handheld display device, a plasma display panel (PDP) display device, a flat panel display device, a 3D game image device, a 3D television set for broadcasting, a 3D display for military affairs, a 3D display for simulation training, a 3D display for medical purposes, etc.

While the present inventive concept has been described in detail with reference to the exemplary embodiments, those skilled in the art will appreciate that various modifications and substitutions can be made thereto without departing from the spirit and scope of the present inventive concept as set forth in the appended claims.

What is claimed is:

1. A stereoscopic image display device, comprising:
   a display unit comprising a plurality of pixel units, wherein at least one of the pixel units has a short side extended in a first direction and a long side extended in a second direction different from the first direction; and
   an image conversion unit comprising a first lenticular lens overlapped with at least two of the pixel units arranged adjacent to each other in the first direction and extended in the second direction, a plurality of first prisms corresponding to the first lenticular lens and alternately arranged in the second direction to expose the first lenticular lens, and a plurality of second prisms corresponding to a second lenticular lens adjacent to the first lenticular lens and alternately arranged in the second direction to expose the second lenticular lens,
   wherein the first prisms have a same shape as each other and the second prisms have a same shape as each other,
   wherein a mid-portion of a short side of each of the first prisms is disposed at a first edge of the first lenticular lens, and a mid-portion of a short side of each of the second prisms is disposed at a second edge of the second lenticular lens,
   wherein the first and second edges meet each other and extend in the second direction, and the mid-portion of the short side of each of the first prisms does not contact the mid-portion of the short side of each of the second prisms where the first and second edges meet, and
   wherein the image conversion unit controls light transmitted through the display unit to convert a two-dimensional image displayed by the display unit into a three-dimensional image.

2. The stereoscopic image display device of claim 1, wherein each of the first prisms comprises a first right-angle triangle shape having an edge slanted from a first terminal portion of the first lenticular lens toward a second terminal portion of the first lenticular lens in the first direction, and
   each of the second prisms comprises the first right-angle triangle shape having an edge slanted from a first terminal portion of the second lenticular lens toward a second terminal portion of the second lenticular lens in the first direction.

3. The stereoscopic image display device of claim 2, wherein a length of each of the first prisms in the first direction is substantially equal to a distance between the first terminal portion of the first lenticular lens and the second terminal portion of the first lenticular lens.

4. The stereoscopic image display device of claim 2, wherein a length of each of the first prisms in the second direction is substantially a half length of the long side of a pixel unit.

5. The stereoscopic image display device of claim 1, wherein the first prisms are disposed below the first lenticular lens and the second prisms are disposed below the second lenticular lens.

* * * * *